United States Patent [19]

Komurasaki et al.

[11] 4,377,999

[45] Mar. 29, 1983

[54] IGNITION TIMING CONTROL SYSTEM FOR INTERNAL COMBUSTION ENGINE

[75] Inventors: Satoshi Komurasaki; Toshio Iwata; Kiyoshi Ookawa, all of Himeji, Japan

[73] Assignee: Mitsubishi Denki Kabushiki Kaisha, Tokyo, Japan

[21] Appl. No.: 150,653

[22] Filed: May 16, 1980

[30] Foreign Application Priority Data

May 21, 1979 [JP] Japan .................................. 54-63415
Jun. 14, 1979 [JP] Japan .................................. 54-75330

[51] Int. Cl.³ .............................................. F02P 5/14
[52] U.S. Cl. .................................. 123/425; 123/424
[58] Field of Search ............... 123/425, 435, 415, 419, 123/424; 73/35

[56] References Cited

U.S. PATENT DOCUMENTS

| | | | |
|---|---|---|---|
| 3,916,855 | 11/1975 | Fauser et al. ........................ | 123/418 |
| 4,104,998 | 8/1978 | Fenn ...................................... | 123/415 |
| 4,111,035 | 9/1978 | West et al. ............................. | 73/35 |
| 4,116,173 | 9/1978 | McDougal et al. ................. | 123/425 |
| 4,138,976 | 2/1979 | Crall ..................................... | 123/424 |
| 4,153,020 | 5/1979 | King et al. ........................... | 123/415 |
| 4,211,194 | 7/1980 | Hattori et al. ....................... | 123/427 |
| 4,282,841 | 8/1981 | Takagi et al. ........................ | 123/425 |

*Primary Examiner*—Craig R. Feinberg
*Assistant Examiner*—Andrew M. Dolinar
*Attorney, Agent, or Firm*—Wenderoth, Lind & Ponack

[57] ABSTRACT

An acceleration sensor senses mechanical noise components and a knock signal originating from an internal combination engine. The knock signal is separated from the attenuated noise components and compared with a DC voltage due to the latter to form pulses. After having been integrated the pulses are applied to a phase shifter through a phase shift disabling circuit resulting in retardation of an ignition time in the normal mode of operation of the engine. When the engine is operated in the low speed mode or started, the phase shift disabling circuit applies a null input to the phase shifter in place of the integrated pulses, to ignite the engine at a reference ignition time.

7 Claims, 6 Drawing Figures

IGNITION TIMING CONTROL SYSTEM FOR INTERNAL COMBUSTION ENGINE

BACKGROUND OF THE INVENTION

This invention relates to an ignition timing control system for an internal combustion engine.

The ignition timing of internal combustion engines is settled so as to maximize the efficiency of the engine with respect to the mode of operation thereof. It is generally desirable to settle the ignition timing so that the particular internal combustion engine approaches a minimum advance for the best torque which may be abbreviated to "MBT" as close as possible within the range in which knocking is not caused in the engine. However, ignition timing control systems previously equipped on internal combustion engines have been, in many causes, of the mechanical type and the ignition advance angle characteristics thereof have not been stable with respect to deviations of dimensions and secular changes of components involved. Therefore, the ignition timing has been actually settled to retrogress fairly behind an ignition time point giving the desirable advance angle characteristic in order to prevent the occurrence of knocking. In this case the engine deteriorates in efficiency. Also even though ignition timing control systems free from both deviations of dimensions and secular changes as described above would be employed, knocking occurring in an associated internal combustion engine depends upon an inlet air temperature and an inlet humidity of the engine and further upon an air fuel ratio thereof etc. Accordingly, if the ignition timing could be settled so as not to cause knocking in the engine in some mode of operation, there might be a fear that knocking would be caused in the engine in another mode of operation.

Therefore by sensing knocking and controlling the ignition timing to retard upon the occurrence of knocking, the ignition timing can be adjusted so that knocking is scarcely caused even though an error would be caused in the ignition advance angle characteristic due to the deviations as described above of mechanical apparatus and differences between the modes of operation. Knocking can be sensed according to any of methods of the measuring a pressure within the combustion chamber of internal combustion engines, the acceleration of vibrations of the engines, sound generated in the engine, etc. In actual motor vehicles the method of measuring an acceleration of vibration of an associated engine is most practical in view of a position where an acceleration sensor involved is mounted, the processing of signals etc. As the method of measuring the acceleration is responsive to a knock signal and simultaneously to vibrational noise signals, knocking has been detected by selecting the knock signal from the vibrational noise signals. However this measure has encountered the problems that in the low speed operation of internal combustion engines or the like the knock signal is low in level, knocking is erroneously detected with other noise signals thereby to control the ignition time point of the engine to either an erroneous time point on the retrogressing side thereof or an unstable time point.

Accordingly it is an object of the present invention to provide a new and improved ignition timing control system for an internal combustion engine making it possible to impart stable ignition time points to the engine to operate the latter with a good efficiency even in an operating range in which knocking is erroneously detected, by disabling the functions of controlling the ignition timing with a knock signal in the low speed mode of operation of the engine.

It is another object of the present invention to provide a new and improved ignition timing control system for an internal combustion engine making it possible to impart stable ignition timing points to the engine to ensure the starting characteristics of the engine during the starting thereof in which knocking is erroneously detected, by disabling the function of controlling ignition timing with a knock signal in the low speed mode of operation of the engine and more particularly during the start thereof.

SUMMARY OF THE INVENTION

The present invention provides an ignition timing control system for an internal combustion engine comprising an acceleration sensor for sensing an acceleration of a vibration of an internal combustion engine, discrimination means for removing noise signal components from an output from the acceleration sensor and selecting a knock signal component from the output, reference ignition timing generator means for generating a reference ignition timing signal, phase shifting means responsive to an output from the discrimination means to shift a phase of the reference ignition timing signal, an ignition coil, switching means for intermitting a current supplied to the ignition coil in response to an output from the phase shifting means, and phase shift disabling means for disabling the phase shifting means to shift and control the phase of the reference ignition timing signal in a predetermined mode of operation of the internal combustion engine.

Preferably the phase shift disabling means may clamp the output from the discrimination means to a specified magnitude.

Alternatively, the phase shift disabling means may include means for bypassing the phase shifting means to apply the reference ignition timing signal to the switching means.

In order to impart stable ignition time points to an internal combustion engine during the start thereof, the present invention may provide an ignition timing control system for an internal combustion engine comprising an acceleration sensor for sensing an acceleration of a vibration of an internal combustion engine, discrimination means for removing noise signal components from an output from the acceleration sensor and selecting a knock signal component from the output, reference ignition timing generator means for generating a reference ignition timing signal, phase shifting means responsive to an output from the discrimination means to shift a phase of the reference ignition timing signal, an ignition coil, switching means for intermitting a current supplied to the ignition coil in response to an output from the phase shifting means, and phase shift disabling means for disabling the phase shifting means to shift and control the phase of the reference ignition timing signal during the start of the internal combustion engine.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
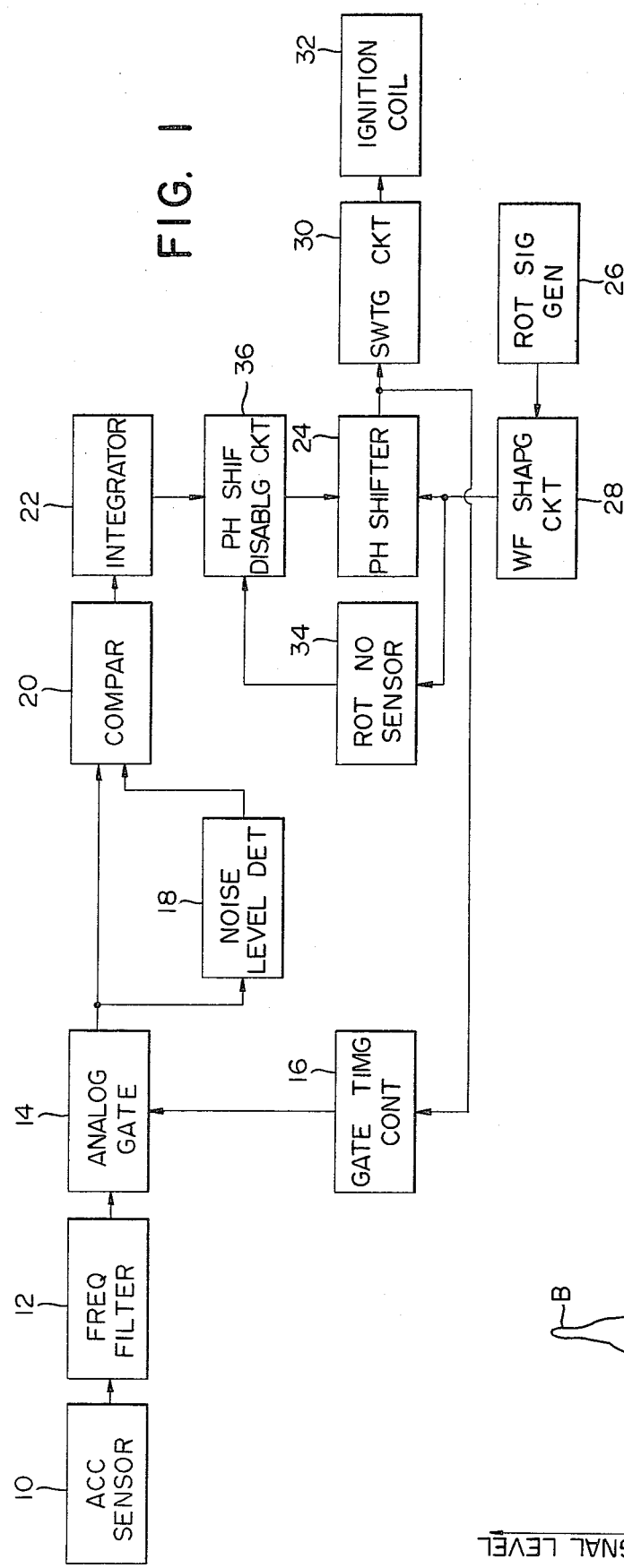
FIG. 1 is a block diagram of one embodiment according to the engine ignition timing control system of the present invention.

Referring now to FIG. 1 of the drawings, there is illustrated one embodiment according to the engine ignition timing control system of the present invention. The arrangement illustrated comprises an acceleration sensor 10 mounted with respect to an internal combustion engine involved (not shown) to sense an acceleration of a vibration of the engine, a frequency filter 12 connected to the acceleration sensor 10 to permit those frequency components of an output signal from the acceleration sensor 10 having a high sensitivity to knocking to pass therethrough, and an analog gate 14 connected to the frequency filter 12 to interrupt various noise components of the output signal from the frequency filter interfering with the detection of knocking, and a gate timing controller 16 connected to the analog gate 14 to generate timing signals for directing the switching of the analog gate 14 during the generation of the various interfering noise components.

The analog gate 14 includes an output connected to both a noise level detector 18 and to a comparator 20 to which the output of the noise level detector 18 is connected. The noise level detector 18 is operative to detect the level of noise signals due to mechanical vibrations of the engine and the comparator 20 is operative to compare an output voltage from the analog gate 14 with that from the noise level detector 18 to generate knock detected pulses.

Then an integrator 22 is operative to integrate detected pulses from the comparator 20 to produce an integrated voltage dependent upon an intensity of the detected knocking. A phase shifter 24 is connected to the integrator 22 through a phase shift disabling circuit 36 as will be described later and is operative to shift a phase of an ignition signal providing a reference in response to the integrated voltage therefrom. Also the phase shifter 24 is connected at the output thereof to the gate timing controller 16.

As shown in FIG. 1, a signal generator 26 is connected to a waveform shaping circuit 28 subsequently connected to the phase shifter 24. The signal generator 26 generates an ignition signal in accordance with a predetermined ignition advance angle characteristic. The waveform shaping circuit 28 shapes the waveform of the ignition signal from the rotation signal generator 26 into a switching pulse having a desired dwell angle through which a current flows through an ignition coil 32. A switching circuit 30 is connected at the input thereof to the phase shifter 24 and at the output thereof to the ignition coil 32 to cause a current supplied to the ignition coil 32 to be interrupted in response to an output signal from the phase shifter 24.

The arrangement comprises further a number-of-rotation sensor circuit 34 connected at the input thereof to the waveform shaping circuit 28 and at the output thereby to phase shift disabling circuit 36 which is, in turn connected between the integrator 22 and the phase shifter 24.

Figure 2:
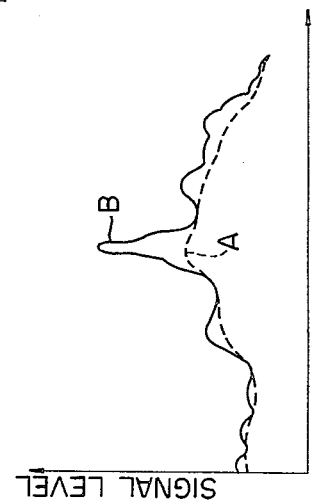
FIG. 2 is a graph illustrating the frequency characteristic of the output from the acceleration sensor shown in FIG. 1.

The output signal from the acceleration sensor 10 has the frequency characteristic as shown by dotted curve A in FIG. 2 in the absence of knocking and as shown by solid curve B in FIG. 2 in the presence of knocking. In the presence of knocking the output signal from the acceleration sensor 10 includes a knock signal attendant upon knocking, mechanical noise components resulting from the vibration of the engine, various noise components passing through signal transfer paths, for example, ignition noise etc. as shown by solid curve B in FIG. 2. From the comparison of solid curve B with dotted curve A it is seen that the knock signal has a peculiar frequency characteristic. Although a difference in frequency distribution between both curves A and B depends upon the particular engine and a position where the acceleration sensor 10 is mounted with respect to the engine, one of the frequency distributions is definitely differentiated from the other distribution by whether or not knocking is caused in the engine. Therefore by passing the output signal including the knock signal from the acceleration sensor 10 through the frequency filter 12, the knock signal remains substantially unchanged in amplitude while the noise signal components having the frequency characteristic other than that of the knock signal can be suppressed. This results in the effective detection of the knock signal.

Figure 3:
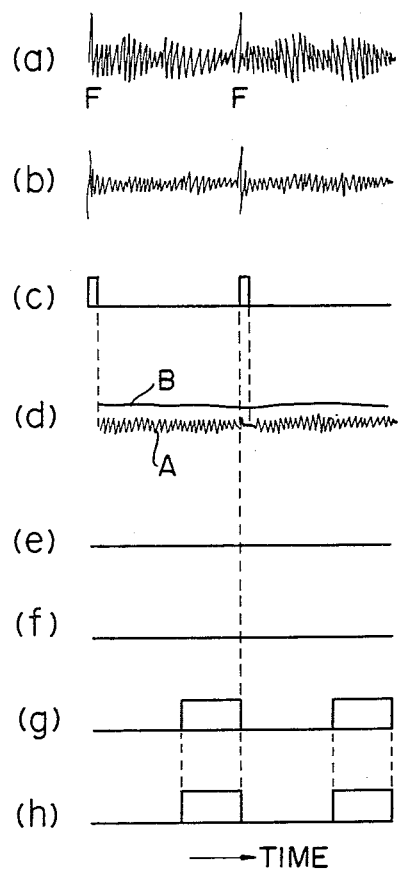
FIG. 3 is a graph illustrating waveforms developed at various points in the arrangement shown in FIG. 1 when no knocking is caused in an associated internal combustion engine.
Figure 4:
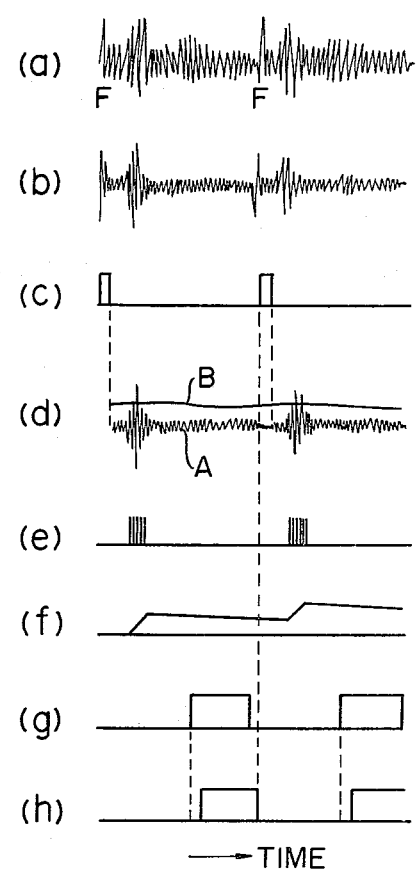
FIG. 4 is a graph similar to FIG. 3 but illustrating the arrangement shown in FIG. 1 when knocking is caused in the engine.

The operation of the arrangement shown in FIG. 1 will now be described with reference to FIGS. 3 and 4. FIG. 3 shows waveforms developed at various points in the arrangement of FIG. 1 when knocking is not quite caused in an internal combustion engine involved, while FIG. 4 shows waveforms developed at the same points as those specified in FIG. 3 when knocking is caused in the engine.

The engine is rotated to cause the signal generator 26 to generate an ignition signal in accordance with the predetermined ignition timing characteristic. The waveform shaping circuit 28 shapes the waveform of the rotation signal into a switching pulse having a desired dwell angle. This switching pulse drives the switching circuit 30 through the phase shifter 24 to cause the current supplied to the ignition coil 32 to intermit. Upon interrupting this current, an ignition voltage induced across the ignition coil 32 ignites and operates the engine. During the operation thereof, the engine causes vibrations which are, in turn, detected by the acceleration sensor 10.

Without knocking caused in the engine, vibrations thereof are not caused from knocking, but the output signal from the acceleration sensor 10 includes mechanical noise and ignition noise passing through the signal transfer path at each ignition time point F as shown at waveform a in FIG. 3. By passing that output signal through the frequency filter 12, signal components due to the mechanical noise are considerably suppressed as shown at waveform b in FIG. 3. However signal components due to the ignition noise may be strong and therefore may be developed at high levels even after the passage thereof through the frequency filter 12. If the latter signal components are left as they are, then the ignition noise will have been mistaken for a knock signal.

In order to avoid such a mistake, an output (see waveform c, FIG. 3) from the gate timing controller 16 which is triggered with the output signal from the phase shifter 24 causes the analog gate 14 to be closed and maintained in its closed state for some time period started with the ignition time point. This results in the interruption of the ignition noise. Therefore only mechanical noise components at low levels are left at the output of the analog gate 14 as shown at waveform d, A in FIG. 3. On the other hand, the noise level detector 18 is responsive to a change in peak value of the output signal from the analog gate 14 to generate a DC voltage having a value somewhat higher than the peak value of the mechanical noise components. It is here to be noted that the noise level detector 18 has a sensitivity with which the detector is operative in response to a relatively slow change in peak value of usual mechanical noise components. This DC voltage is shown at waveform d, B in FIG. 3. As shown at waveforms d, A and d, B, the output from the noise level detector 18 is higher than the mean peak value of the output from the analog gate 14 and therefore the comparator 20 compares the two with each other to provide a null output as shown in FIG. 3, e. As a result, the noise signals are entirely removed.

From the foregoing it is seen that the frequency filter 12 along with the analog gate 14 and the gate timing controller 16 forms discrimination means for removing the noise signal components from the output voltage from the acceleration sensor 10, and selecting the knock signal from that output voltage.

Under these circumstances, an output voltage from the integrator 22 remains null as shown in FIG. 3, f and a phase angle shifted by the phase shifter 24 becomes null. Accordingly, the switching circuit 30 is driven with the output from the phase shifter 24 to switch in phase with the reference ignition signal from the waveform shaping circuit 28 (see waveform g, FIG. 3). Thus a current flowing through the ignition coil 32 is turned on and off in phase with that reference ignition signal as illustrated at waveform h in FIG. 3. As a result, the ignition time point coincides with the reference ignition time point F.

Upon the occurrence of knocking, the output signal from the acceleration sensor 10 includes, in addition to the noise components as described above in conjunction with the waveform a shown in FIG. 3, a knock signal developed with some time delay relative to each ignition time point F as shown at waveform a in FIG. 4. After having passed through the frequency filter 12, the knock signal is scarcely attenuated and the noise signals are considerably attenuated as shown at waveform b in FIG. 4. This waveform b passes through the analog gate 14 after the closure thereof as described above to change to waveform A as shown in FIG. 4d including high knock signals superposed on the attenuated mechanical noise components. As those knock signals leaving the analog gate 14 are sharp in rise, a DC voltage level (see waveform B, FIG. 4d) delivered from the noise level detector 18 lags in response with respect to the knock signals.

As a result, the comparator 20 having the waveforms A and B as shown in FIG. 4d applied thereto produces pulses at the output as shown at waveform e in FIG. 4. Then the integrator 22 integrates those pulses into an integrated voltage as shown at waveform f in FIG. 4.

The phase shifter 24 responds to the integrated voltage to shift the phase of the output signal from the waveform shaping circuit 28 to the rated side (see waveform g, FIG. 4). This results in the output from the phase shifter 24 having its phase lagging behind that of the reference ignition signal from the waveform shaper circuit 28. This output drives the switching circuit 30 with its phase shown at waveform h in FIG. 4. Accordingly, the ignition time point retards, whereby knocking is prevented, thus to resulting in a knocking free state. Then the conditions shown in FIGS. 3 and 4 are repeated to effect the optimum ignition timing control.

In the low speed mode of operation of an internal combustion engine involved, the two input levels shown in FIG. 3d applied to the comparator 20 are close to each other, so that pulses may be developed at the output of the comparator 20 due to a delicate variation in output from the analog gate 14 (see waveform A, FIG. 3). That output or the waveform A shown in FIG. 3d may be equivalent to the waveform A shown in FIG. 4, which results in malfunction. This is because the output from the acceleration sensor 10 is at a low level as a result of the vibration of the engine below low in the low speed mode of operation or because the characteristics of the noise level detector 18 have been preliminarily set to a level ensuring the detection of knocking. In other words, the noise level detector 18 is operated in a dynamic range adapted to a region of rotations of the engine in the normal travel mode of operation.

With the foregoing in view, the number-of-rotation sensor circuit 34 has been connected to the waveform shaping circuit 28 and the phase shift disabling circuit 36 is connected to that sensor circuit 34 and also between the integrator 22 and the phase shifter 24.

Figure 5:
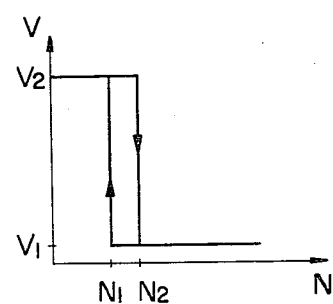
FIG. 5 is a graph illustrating the operating characteristic of the number-of-rotation sensor shown in FIG. 1.

The number-of-rotation sensor circuit 34 has an operating characteristic as shown in FIG. 5 wherein an output V therefrom is plotted in the ordinate against the number of rotations N per unit time of the engine in the abscissa. From FIG. 5 it is seen that, when the engine is increased in the number of rotations per unit time, the output held at its higher level $V_2$ from the number-of-rotation sensor circuit 34 abruptly decreases to be at its lower level $V_1$ upon the engine reaching a predetermined magnitude $N_2$ of the number of rotations per unit time thereof, after which the output from sensor circuit 34 is held at its lower level $V_1$. On the other hand, when the engine decreases in the number of rotations per unit time, the output held at its low level $V_1$ from the sensor circuit 34 abruptly increases to be at its higher level $V_2$ upon the engine reaching another predetermined magnitude $N_1$ of the number of rotations per unit time thereof less than the predetermined magnitude $N_2$ thereof after which the output is held at its higher level $V_2$.

Therefore the operating characteristic of the number-of-rotation sensor circuit 34 depicts a hysteresis loop. This is because the output from the sensor circuit 34 is prevented from effecting hunting due to minute variations in the number of rotations per unit time of the engine about the predetermined magnitude $N_1$ or $N_2$ thereof.

The phase shift disabling circuit 36 is responsive to the output from the number-of-rotation sensor circuit 34 to be operated so that, with that output held at its higher level $V_2$, the phase shifting disabling circuit 36 prevents the ignition timing control voltage delivered by the integrator 22 from passing therethrough. This results in a null control to input being applied to the phase shifter 24. However it is to be understood that the control input is not required to be always null and that the same may be held at a desired low magnitude to keep a predetermined lag angle. On the contrary, when the output from the number-of-rotation sensor circuit 34 is at its lower level $V_1$ the phase shift disabling circuit 36 permits the intact ignition timing control voltage from the integrator 22 to be transferred, as a control input, to the phase shifter 24.

In other words, an ignition timing control system relying on the knock signal is formed in the region of rotations of the engine where the acceleration sensor 10 provides the output at a satisfactory level and knocking can be sufficiently suppressed upon the occurrence thereof, while the control system just described is disabled from performing the control operation in a region of low speed rotations of the engine where the acceleration sensor 10 provides the output at such a low level that knocking may be erroneously detected. In the latter case, the control system is changed to an ignition system including solely the switching circuit connected therein.

Figure 6:
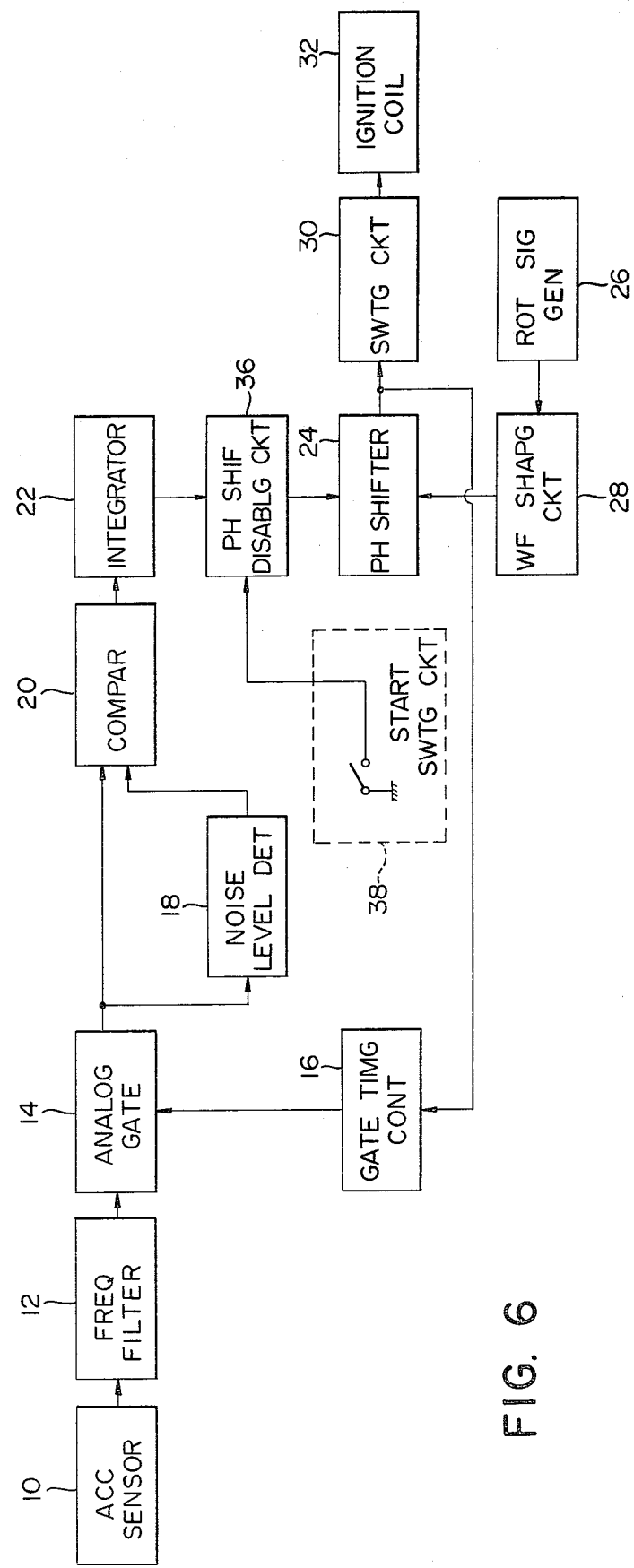
FIG. 6 is a block diagram of a modification of the present invention.

A modification of the present invention illustrated in FIG. 6 is different from that shown in FIG. 1 only in that in FIG. 6 a start switching circuit 38 is substituted for the number-of-rotation sensor circuit 34. The start switching circuit 38 is shown in FIG. 6 as comprising a normally open switch including a stationary contact connected to the phase shift disabling circuit 36 and a movable arm connected to ground. The switch illustrated is responsive to the start of the particular internal combustion engine to engage the movable arm with the stationary contact to produce a contact closure type signal which is, in turn applied to the phase shift disabling circuit 36.

The operation of the arrangement shown in FIG. 6 will now be described. With the engine operated in the normal mode, the switch included in the start switching circuit 38 is held in its open position and the phase shift disabling circuit 36 supplies to the phase shifter 24 an input signal applied thereto as it remains intact. When knocking is not caused in the engine, the integrator 22 provides a null output such as shown in FIG. 3f and this null output is supplied to the phase shifter 24. Under these circumstances, the phase shifter 24, and the switching circuit 30 are operated in the same manner as described above in conjunction with waveforms g and f shown in FIG. 3. Therefore the ignition time point coincides with the reference ignition time point.

Only during the start of the engine is the switch disposed in the starting switch circuit 38 brought into its closed position to apply a contact closure type signal to the phase shift disabling circuit 36. Thus the phase shift disabling circuit 36 is operated in the mode controlled with the contact closure type signal. Under these circumstances even though knocking is caused in the engine, the phase shift disabling output 36 supplies a null control input to the phase shifter 24 regardless of the output provided by the integrator 22. Accordingly, the ignition time point is determined by the reference ignition timing signal as described above in conjunction with the normal mode of operation of the engine.

From the foregoing it is seen that the present invention provides an ignition timing control system for suppressing knocking caused in an internal combustion engine put in the normal mode of operation by selecting a knock signal with a special frequency characteristic from an output from an acceleration sensor for sensing the acceleration of vibrations of the engine and causing ignition time points of the engine to retard in accordance with the level of the selected knock signal. However the ignition timing control system is changed to a simple switching circuit system by disabling the control function in the low speed mode of operation or during the start of the engine in which the acceleration sensor provides the output at such a low level that knocking is erroneously detected. Therefore stable ignition time points can be established in the low speed mode of operation or during the start of internal combustion engines while in the normal mode of operation knocking can be stably suppressed and ignition time points can be established with a high engine efficiency maintained good.

Figure 7:
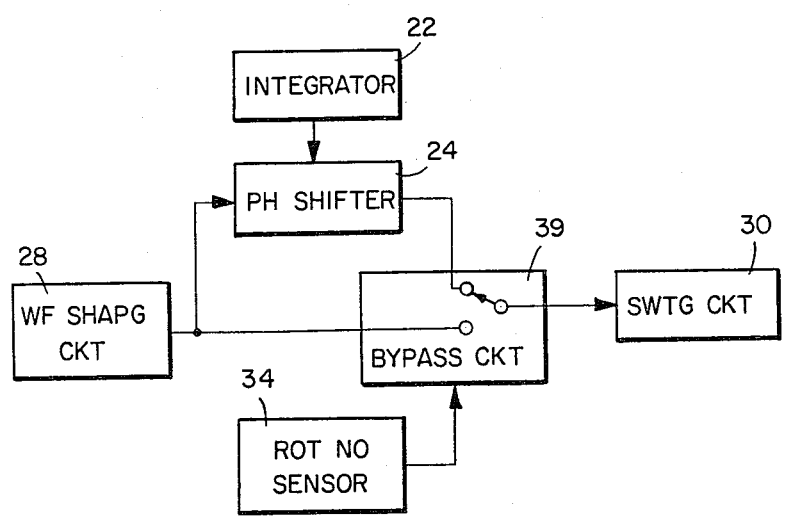
FIGS. 7 and 8 are block diagrams of further modifications of the present invention.
Figure 8:
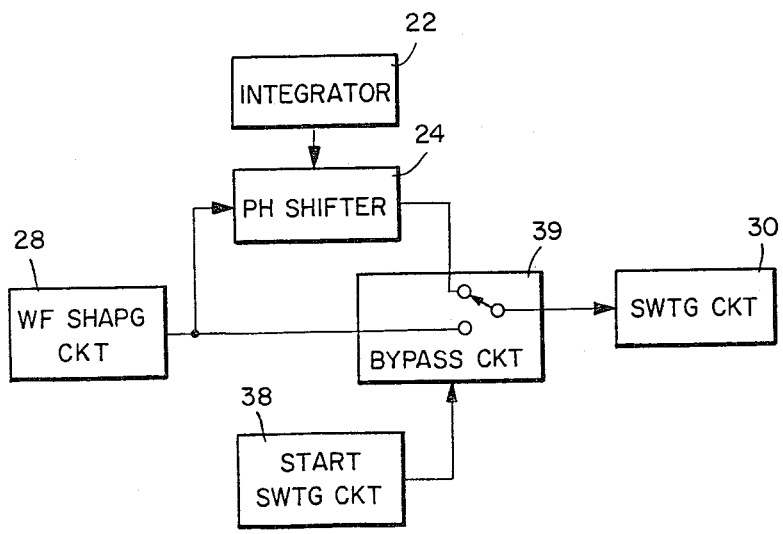

While the present invention has been illustrated and described in conjunction with a few preferred embodiments thereof it is to be understood that numerous changes and modifications may be resorted to without departing from the spirit and scope of the present invention. For example, while the phase shift disabling circuit has been connected to the output of the integrator, it is to be understood that the same may be connected to the output of the comparator. Also instead of the intermittent control of the control input applied to the phase shifter, a bypass circuit 39 may be provided to disable the phase shifter in the low speed mode of operation of the particular internal combustion engine, FIG. 7 and during the start thereof, FIG. 8, and the switching circuit may include the input directly connected to the output of the waveform shaping circuit. Further, the phase shifter may additionally perform the bypassing function of disabling the same in the low speed mode of operation of the engine and during the start thereof.

What we claim is:
1. An ignition timing control system comprising:
reference ignition timing generator means for generating a reference ignition timing signal including reference ignition timing points;
an ignition coil;
switching means responsive to said reference ignition timing generator means for intermitting a current supplied to said ignition coil;
phase shifting means receiving said reference ignition timing signal for transmitting said reference ignition timing signal to said switching means;
acceleration sensor means for sensing acceleration of vibration of an internal combustion engine and for generating an output including mechanical noise signal components, ignition noise signal components, and any knock signal components;
frequency filter means for receiving said output from said acceleration sensor means and for removing therefrom said mechanical noise signal components except low level noise signal components and for generating an output;
an analog gate positioned to receive said output from said frequency filter means;
gate timing controller means, connected between said phase shifting means and said analog gate, for closing said analog gate for a time period beginning with each said ignition time point, and thereby for removing said ignition noise signal components, whereby said analog gate passes an output signal including only low level mechanical noise signal components and any knock signal components;
noise level detector means for receiving said output signal from said analog gate and for generating a

DC output having a value higher than the peak value of said low level mechanical noise signal components;

comparator means for receiving and comparing said output signal from said analog gate and said output from said noise level detector means, and for generating a null output in the absence of any said knock signal components and for generating a pulsed output responsive to the presence of any said knock signal components;

integrator means for receiving said outputs from said comparator means and for integrating said pulsed output upon receipt thereof and generating an integrated voltage dependent upon said knock signal components;

said phase shifting means being connected to said integrator means and being responsive to receipt therefrom of a null voltage for transmitting said reference ignition timing signal to said switching means, and said phase shifting means being responsive to receipt from said integrator means of said integrated voltage for shifting the phase of said reference ignition timing signal dependent upon the level of said integrated voltage and thereby the amplitude of said knock signal components; and phase shift disabling means for disabling said phase shifting means in a predetermined mode of operation of the internal combustion engine, whereby said reference ignition timing signal is continuously transmitted to said switching means without phase shift.

2. An ignition timing control system as claimed in claim 1, wherein said phase shift disabling means is operable to disable said phase shifting means in the low speed mode of operation of said internal combustion engine.

3. An ignition timing control system as claimed in claims 1 or 2, wherein said phase shift disabling means clamps said outputs from said comparator means to a specified magnitude.

4. An ignition timing control means as claimed in claims 1 or 2, wherein said phase shift disabling means includes means for bypassing said phase shifting means to supply said reference ignition timing signal to said switching means.

5. An ignition timing control system comprising:

reference ignition timing generator means for generating a reference ignition timing signal including reference ignition timing points;

an ignition coil;

switching means responsive to said reference ignition timing generator means for intermitting a current supplied to said ignition coil;

phase shifting means receiving said reference ignition timing signal for transmitting said reference ignition timing signal to said switching means;

acceleration sensor means for sensing acceleration of vibration of an internal combustion engine and for generating an output including mechanical noise signal components, ignition noise signal components, and any knock signal components;

frequency filter means for receiving said output from said acceleration sensor means and for removing therefrom said mechanical noise signal components except low level noise signal components and for generating an output;

an analog gate positioned to receive said output from said frequency filter means;

gate timing controller means, connected between said phase shifting means and said analog gate, for closing said analog gate for a time period beginning with each said ignition time point, and thereby for removing said ignition noise signal components, whereby said analog gate passes an output signal including only low level mechanical noise signal components and any knock signal components;

noise level detector means for receiving said output signal from said analog gate and for generating a DC output having a value higher than the peak value of said low level mechanical noise signal components;

comparator means for receiving and comparing said output signal from said analog gate and said output from said noise detector means, and for generating a null output in the absence of any said knock signal components and for generating a pulsed output responsive to the presence of any said knock signal components;

integrator means for receiving said outputs from said comparator means and for integrating said pulsed output upon receipt thereof and generating an integrated voltage dependent upon said knock signal components;

said phase shifting means being connected to said integrator means and being responsive to receipt therefrom of a null voltage for transmitting said reference ignition timing signal to said switching means, and said phase shifting means being responsive to receipt from said integrator means of said integrated voltage for shifting the phase of said reference ignition timing signal dependent upon the level of said integrated voltage and thereby the amplitude of said knock signal components; and phase shift disabling means for disabling said phase shifting means during starting of the internal combustion engine, whereby said reference ignition timing signal is transmitted to said switching means without phase shift.

6. An ignition timing control system as claimed in claim 4, wherein said phase shift disabling means clamps said outputs from said comparator means to a specified magnitude.

7. An ignition timing control system as claimed in claim 5, wherein said phase shift disabling means includes means for bypassing said phase shifting means to supply said reference ignition timing signal to said switching means.

* * * * *